United States Patent [19]

Folger

[11] Patent Number: 5,722,591
[45] Date of Patent: Mar. 3, 1998

[54] APPARATUS FOR SPREADING BULK MATERIALS

[76] Inventor: Wolfgang Folger, Hinter den Bergen 21, 68766 Hockenheim, Germany

[21] Appl. No.: 555,607

[22] Filed: Nov. 9, 1995

[30] Foreign Application Priority Data

| Dec. 12, 1994 | [DE] | Germany | 44 44 127.4 |
| Dec. 12, 1994 | [DE] | Germany | 44 44 128.2 |
| Dec. 12, 1994 | [DE] | Germany | 44 44 129.0 |
| Sep. 18, 1995 | [DE] | Germany | 195 34 565.7 |

[51] Int. Cl.$^6$ .................................. B64D 1/18
[52] U.S. Cl. .................. 239/171; 239/681; 222/333; 244/136
[58] Field of Search ................ 239/171, 668, 239/679, 681, 687, 667; 244/136; 403/256, 294; 416/204 R, 219 R; 222/333, 310, 251, 181.2

[56] References Cited

U.S. PATENT DOCUMENTS

| 940,891 | 11/1909 | Plummer | 239/667 |
| 3,204,896 | 9/1965 | Smith et al. | 244/136 |
| 3,463,398 | 8/1969 | Smith et al. | 239/171 |
| 3,512,721 | 5/1970 | Barlow et al. | 239/668 |
| 3,537,649 | 11/1970 | Van der Lely et al. | 239/668 |
| 3,688,952 | 9/1972 | Barlow et al. | 222/333 |
| 3,777,978 | 12/1973 | Manicatide et al. | 239/171 |
| 4,099,689 | 7/1978 | Sterner et al. | 244/136 |
| 4,260,108 | 4/1981 | Maedgen, Jr. | 239/171 |
| 4,382,568 | 5/1983 | Schertz | 244/136 |
| 4,395,002 | 7/1983 | Kantojärvi et al. | 244/136 |
| 4,991,781 | 2/1991 | Barbieri | 239/661 |

FOREIGN PATENT DOCUMENTS

| 0571355 | 3/1993 | European Pat. Off. |
| 2628251 | 1/1978 | Germany |
| 53-69175 | 6/1978 | Japan |
| 573839 | 3/1976 | Switzerland |

Primary Examiner—Andres Kashnikow
Assistant Examiner—Lisa Ann Douglas
Attorney, Agent, or Firm—Furgang & Milde, LLP

[57] ABSTRACT

A spreading apparatus for hitching to a helicopter includes a hopper suspended from a ring, three tubular legs with upper ends releasably attached to the ring, and a strut between each pair of legs. A plurality of tension cables are provided, each cable having a top end joined to the ring at a leg attachment point and a bottom end joined to a rubber roller inserted between adjacent struts where they attach to a leg with a coupling.

21 Claims, 5 Drawing Sheets

APPARATUS FOR SPREADING BULK MATERIALS

BACKGROUND OF THE INVENTION

The invention relates to a spreading apparatus to be hitched by cables to the hoist hook of a helicopter. The apparatus has a downwardly tapering (trunco-conical) hopper for the material to be spread. At the bottom end thereof is a shuttered opening. Furthermore, three legs are provided on which the hopper stands, for example while being filled. Underneath the opening is a motor-driven scatter disk which rotates in operation and scatters horizontally the material that falls on it. At the bottom third of the container there is usually mounted a shaking mechanism whose purpose is to produce a flow of any material that is not free-flowing.

Such apparatus are used, for example, in the following applications:

Liming of forests and watershed areas for protection of the soil and vegetation against increasing soil acidification.

Fertilization in agriculture, forestry and vineyards.

Spreading of oil-binding substances and other solids which are to be evenly distributed from the air.

The examples given in the following text are focused on liming, since this application presents the most difficult requirements in every respect, and is of the greatest economic importance on account of the extent to which it is needed.

SUMMARY OF THE INVENTION

It is the task of the invention to create a very light, strong and easy-to-repair apparatus. This is accomplished by a spreader having three vertical legs with upper ends attached to a ring from which the hopper is suspended. Each pair of legs is separated by a strut releasably attached to the legs, the assembly being held together by tension cables joined to the ring at leg attachment points and extending around adjacent legs at strut attachment points so that the legs are drawn against the struts. This arrangement gives the apparatus some freedom of movement at the joints so that it can better distribute stresses.

The apparatus according to the invention satisfies requirements which offer immense economic advantages. Also to be noted is the resultant, considerably improved ecological balance (performance versus energy consumption).

LIST OF REQUIREMENTS

The following requirements 1 to 4 ensue from two equally important premises:

---

A

Light empty weight (The typical ratio
of empty weight to total weight is approximately
8:100 for the apparatus of the invention.
In apparatus of the prior art this ratio usually
amounted to about 20:100.

B

Ability to handle all of the materials
in question, even when they are in an extremely
unfavorable condition (as for example, left
uncovered, left standing outdoors on dirt trails,
exposed to weather.)

---

1. Long-term stability under normal loading
    Definition of normal loading:
    Abrupt filling with the material (e.g., from front-end loaders) with the spreader standing on uneven ground. This results in severe racking stress due to asymmetry and alternating flexural stresses.
    Abrupt lift-off of the loaded spreader, point stresses, application of acceleration stresses through the carrying cables.
    High-frequency vibration by the shaker and low-frequency vibration due to imbalance in the scatter disk (the materials commonly used have a great tendency to cause cracking).
    Landing shock, often by free fall from, say, one meter of height.
    Capsizing of the empty spreader.
2. Substantial insensitivity to occasional stresses such as:
    Rough landing resulting from free fall from, say, two meters of height.
    Collision (while hanging from the suspending cables) with front-end loaders or other solid object, with bumpers in place.
    Capsizing of the full spreader with holding ring guard in place.
3. Virtually entire freedom from maintenance except for
    General visual inspection, especially after events such as mentioned under 2. above.
    Inspection of cable rigging.
    Inspection of the slingers on the spreader disk (inexpensive consumable parts).
    Inspection and maintenance of the internal combustion engine if such is used.
4. Ease of repair, including field repairs
    with ordinary tools without special skill on the part of personnel.
    easy replacement of damaged parts due to strictly modular construction.
    use of commercially available materials and parts.

In contrast, these requirements have been satisfied only imperfectly by spreaders according to the state of the art. When satisfied in a half-way acceptable manner in certain areas, this has been contrary to the requirement of the lowest possible empty weight.

The discharge of the material being spread is reckoned almost exclusively in units of weight. In the aircraft the weight to be carried (plus uncontrollable factors such as weather and flight distances) is the most important limiting factor.

In the case of a widely used helicopter type (AS 350) the rated hook load amounts to 900 Kp. The typical spreader systems for this machine weigh between 170 Kp and 200 Kp. Using the lowest figure (170 Kp) the machine can, thus transport a net amount of 730 Kp of material to be spread. A common annual spreading operation amounts to about 25,000 metric tons. For this purpose more than 34,000 sorties are needed.

A spreader according to the invention weighs, for this load, about 70 Kp, and this while satisfying all of the conditions in the list of requirements.

34,000 sorties with a system lighter by 100 Kp, using the same media (crew as well as material) result in an improvement of 3,400 metric tons. At this time the spreading of one metric ton is worth about 70.00 deutsche marks. The direct economic advantage is thus around 238,000 DM per year. At the same time the anticipated cost of the spreader is approximately identical to that of the system used heretofore.

Indirect economic advantages:

The satisfaction of the condition described under Premise B of the List of Requirements make possible:

The open handling of the material to be spread, parking on dirt trails, no need to cover the material.

All these points are very problematical when conventional systems are used. This is especially true when clumpy, very finely ground limestone is used. Frequently in such cases the material does not flow uniformly (it comes out in clumps), or the container clogs completely and has to be emptied with great effort. If at the end only a small amount of lime is left, impurities lead very frequently to clogging. Consequently residues necessarily remain, which the customer does not like to see, and they result in price reductions. Locations nearer to the forest areas to be treated are abandoned in favor of a harder road surface for storage, and this results in longer flight distances.

Often much work is required in order to cover the lime with tarpaulins in rainy weather, assemble tarpaulins blown away by the wind, replace stolen tarpaulins, etc.

The entire process, from the selection of the lime through the handling of the hoppers to the spreading of the material, involves many problems if the material has to be "tailored" to the spreader.

The logistical problems are solved with the spreading system according to the invention, which does away with these undesirable conditions.

Satisfying the requirements of durability and substantial ruggedness mentioned in the list will prevent long waits and provide relief for the pilot, who has to make up to 300 round trips daily without having to set down the spreader like a raw egg every time so as not to shorten its life.

The invention also relates to an improved shutter for the opening at the bottom end of the hopper.

Additionally, the invention relates to an improved scatter disk in which the slingers can be readily replaced.

The invention also relates to a disk and hopper designed to stop the flow of material when the disk is stationary. This is accomplished by configuring the disk and locating it with respect to the hopper opening so that the bulk material attains its angle of rest on the disk, without overflowing the disk, when the disk is stationary. This eliminates the need for a separate shutter, thereby lowering the price and the weight of the bulk material container.

BRIEF DESCRIPTION OF THE DRAWING

FIG. 11b shows the trunco-conical scattering disk of FIG. 11a.

DETAILED DESCRIPTION OF THE PREFERRED EMBODIMENTS

Figure 1:
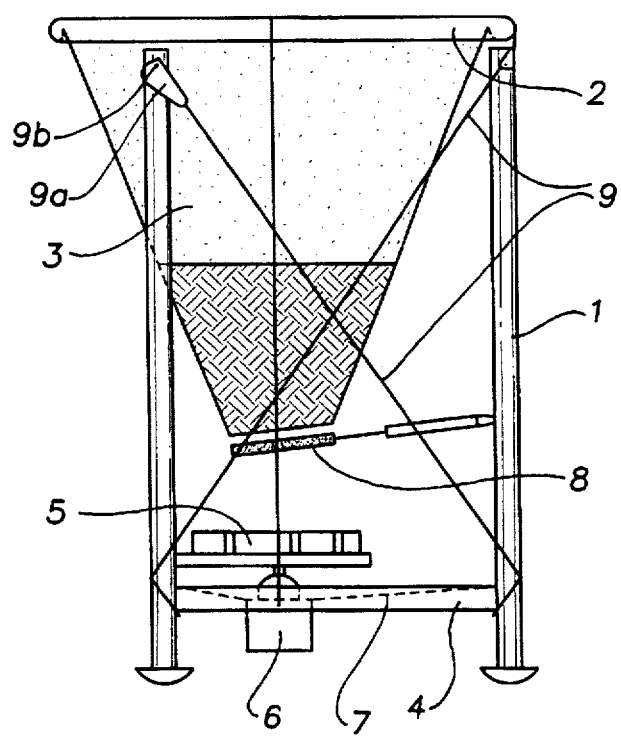
FIG. 1 is a side elevational view of the entire apparatus.

In FIG. 1 can be seen a side view of the apparatus. It shows two of the three legs 1 of high strength aluminum tubing (the third is omitted for simplicity), a ring of aluminum tubing 2, a hopper 3 of truncoconical shape, one of three struts 4 of aluminum tubing, a scatter disk 5 with motor 6, a suspension 7 indicated schematically in FIG. 1, a shutter 8 on the opening of the hopper, and two of six tension cables 9.

Figure 4:
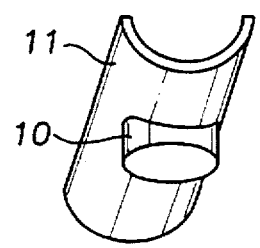
FIGS. 4 and 5 show various parts for connecting the legs to the ring (FIG. 4) and to the struts (FIG. 5), respectively.

At the junction points of the ring 2 with the legs 1, couplings corresponding to FIG. 4 are provided. The tube section 10 is introduced into the upper end of the leg 1. Part 11 at right angles to it lies in the assembled state on the ring 2 and therefore has the external shape conforming to the ring 2. Part 11 is preferably connected to the ring by two clamps.

Figure 5:
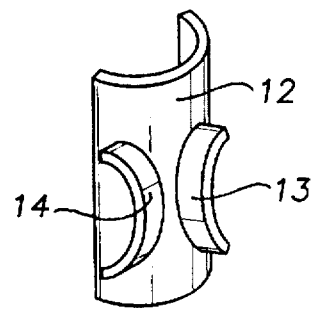

To connect the struts 4 to the legs 1, couplings according to FIG. 5 are used. They consist of a part 12 conforming to the external shape of the leg, which in the assembled state lies against the leg 1 and can be fastened to the latter with clamps. The two portions 13 and 14 attached to portion 12 are so disposed and shaped that in the assembled state they reach into the struts 4 and are in contact with their inside walls. The tension cables 9 are affixed to the ring 2 at the top, and run to the point where the adjacent leg joins the strut. At bottom they run around the legs 1 and thus draw each leg against two struts 4. The tightened tension cables provide the structure with the stability needed for rough handling, since the cables take the bending loads and moments. They can be fastened to the struts at the points where the struts 4 are fastened to the legs.

The tension cables can also be guided over the top of the legs and the ring 2. As shown on the left hand leg, the cable 9 is connected to a shackle 9a which is fixed to the leg by a pin 9b which also passes through tube section 10. The cable is thus connected to ring 2 by the clamps which fix the part 11 to the ring 2.

Figure 2:
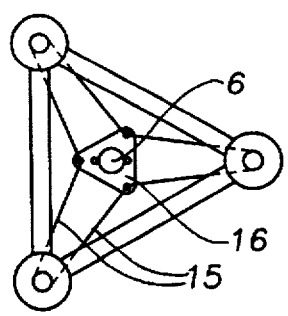
FIG. 2 shows how the spreader plate with its motor is mounted.
Figure 3:
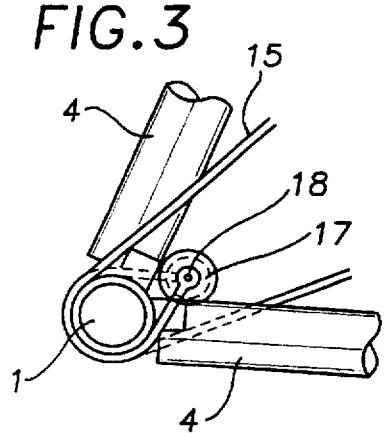
FIG. 3 is an enlarged representation of how the tension cables are anchored.

FIG. 2 shows the mounting and suspension of the scatter disk 5 with motor 6 as seen from below (plate 5 not shown). Scatter disk 5 with the hydraulic motor 6 is mounted on a supporting plate 16 which is suspended by six suspension cables 15. The suspension cables 15 are fastened to the struts at their junction with the legs 1, and preferably in the manner shown in FIG. 3. There a leg 1 and portions of two struts 4 are indicated. Between the struts 4 there is a rubber roller 17 whose shaft 18 protrudes past both ends of the rubber roller. The stretcher cables 15 running to the leg 1 are passed around the leg 1 and connected to the bottom end of shaft 18 (suspended).

Likewise, the corresponding tension cables 9 are preferably brought around the leg 1 and likewise connected to both ends of the shaft 18. Forces (bending, twisting) acting on the spreader from the outside will produce the result, due to the application of these forces to the junction points (joints), that the junction points of the parts become stabilized. The effects are smoothed out (damped) by the rubber roller 17.

Figure 6:
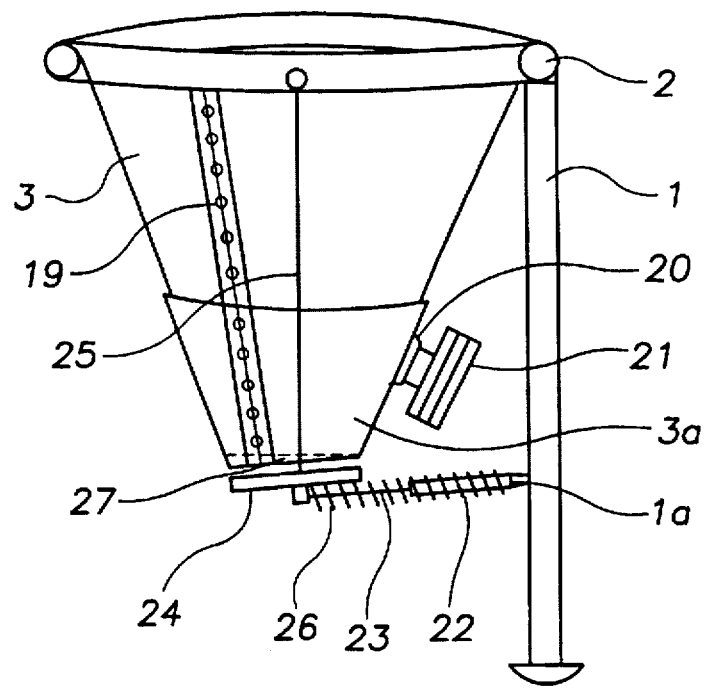
FIG. 6 is a side view of the hopper and the shutter.

FIG. 6 shows the hopper 3. It consists of ultra-high molecular weight polyethylene and is formed of a plurality of multiple webs riveted together along seams 19. At the upper end it is attached to the ring 2. At the bottom area 3a the hopper is reinforced by a multilayer carbon fiber fabric. The carbon fiber fabric is wound onto the outside wall of the hopper and impregnated with synthetic resin (laminated). Due to the rivets it is not possible for the carbon fiber layer to slip down off the hopper. On the reinforced area, mounting parts 20 can be embedded, to which a shaker 21, for example, can be bolted. The property of the carbon fiber laminate (high strength and great hardness) is advantageous to the transfer of the vibration produced by the shaker to the material to be spread.

Figure 7:
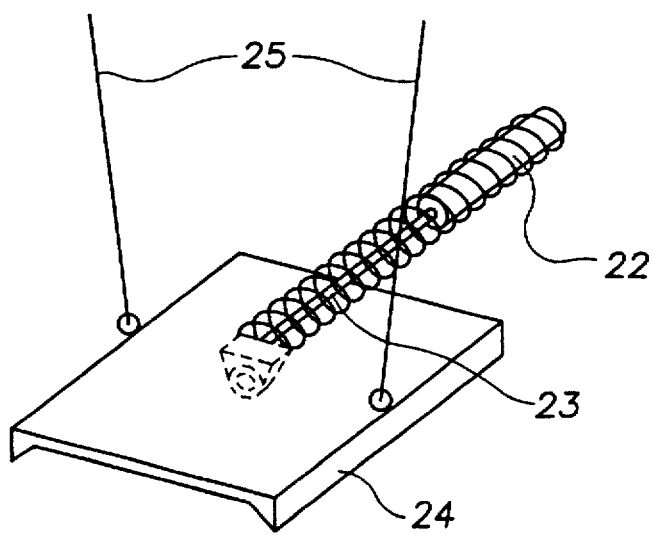
FIG. 7 is a perspective view of the shutter.

FIGS. 6 and 7 show a simple yet very functional possibility for the configuration of the shutter on the discharge opening. It is articulated for pivotal movement on one leg 1 (point 1a) and consists of a cylinder 22 with an actuating piston plus connecting rod 23 and a shutter plate 24 fastened thereon, which is mounted on two cables 25. When the piston is actuated by hydraulic fluid, the shutter plate 24 swings, against the force of a spring 26, in front of the opening of the hopper 3. Without the hydraulic pressure, the action of the spring 26 holds it in the position shown in FIG. 6. As shown, the cables 25 are fastened to the ring 2.

As it is easy to see from FIG. 6, the points determined by the ends of the cables 25, and hence the shutter plate 24, describe an arc when the cylinder 22 is operated. To obviate collision of the shutter plate with the hopper mouth, the latter is beveled (angle 27). In the basic position (shutter closed) the shutter 24 and the mouth form one line.

On the legs of the spreader shock dampers are preferably provided. Preferably these shock dampers operate in the manner of an air pump: when the legs strike the ground, the feet operate a piston through a piston rod, so that this piston is moved in a cylinder against the force of a spring and the compressed volume of air. Through an adjustable throttle the compressed air then escapes. Not until the hopper is again lifted by the helicopter does the spring return the piston and hence the feet back into the starting position.

Figure 8B:
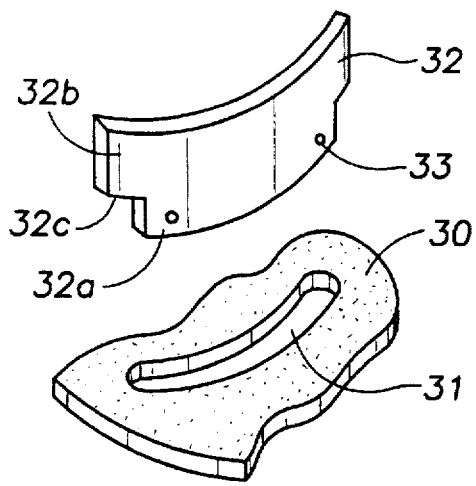
FIGS. 8a, 8b, and 8c show details of the scatter disk.
Figure 8C:
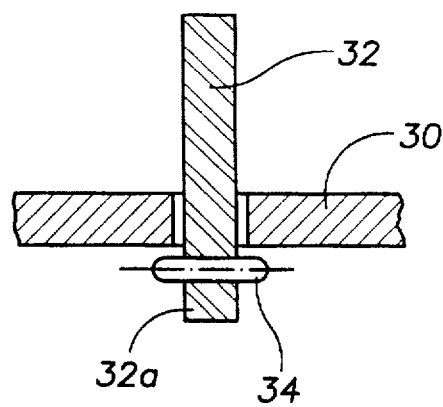
Figure 8A:
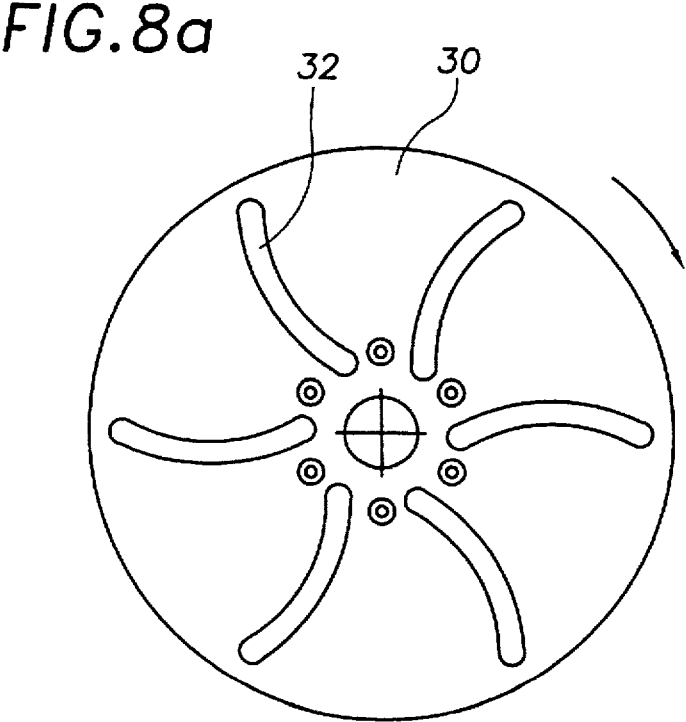

FIG. 8a represents a top plan view of the scatter disk 4 according to the invention. It consists of a disk 30 of metal, for example, but preferably of a thermoplastic, especially ultra-high molecular weight polyethylene and of curved slingers 32 in an essentially radial arrangement. When in operation the scatter disk rotates in the direction indicated by an arrow. Preferably the curve of the slingers is such that the radius of curvature diminishes from the inside out.

In FIG. 8b, which represents a perspective view of section of the scatter disk 4 in the uninstalled state, it can be seen that the disk 30 has essentially radially arranged slots 31 and that the slingers 32 have lower portions 32a which fit into these slots (the expression, "radially arranged slots," is also intended to include an arrangement in which the slot 31 is divided into two or more sections, and part 32 is adapted accordingly). Upper portions 32b have downward facing shoulders 32c which rest against the upper surface of disk 30.

From FIGS. 8b and 8c, showing a section through a portion of the scatter disk it can be seen that lower portions 32a have openings 33 through which pins 34 are driven to fasten the slingers.

Figure 9:
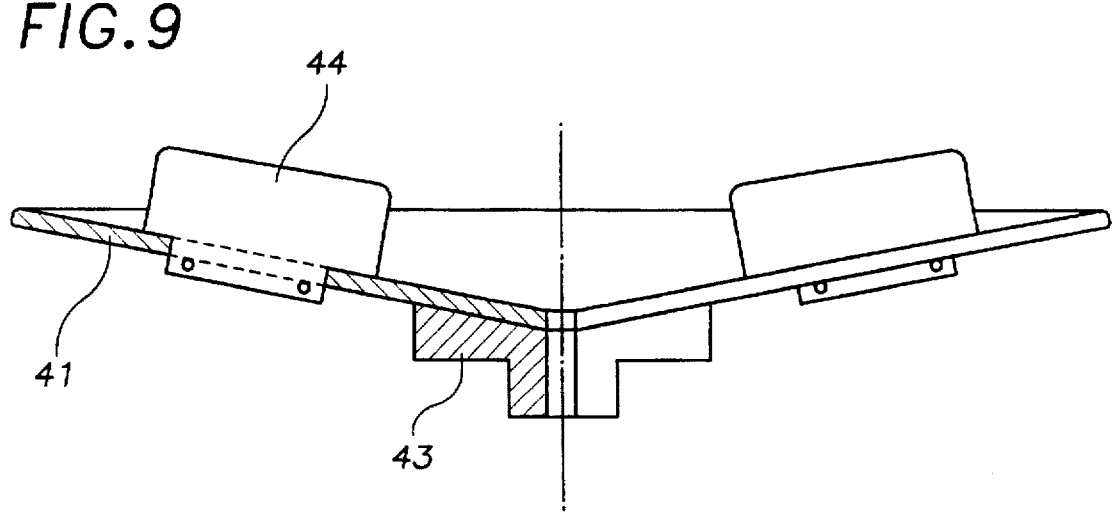
FIG. 9 shows a trunco-conical embodiment of scattering disk.

FIG. 9 shows a distributing disk according to an alternative embodiment in partial cross section. It consists of a body 41, the surface of which has the form of a flattened (large base, small height), truncated cone. In the installed state, i.e., standing on its small end as shown, body 41 is connected to a drive motor located underneath. A flange 43 is used to connect the disk to the motor. Body 41 lacks a base, which means that it has the overall shape of a concave dish 92. Distributing fins 44 are attached to the surface of the concave dish which is open at the top. Fins 44 can be attached to dish 41 in conjunction with FIGS. 8a, 8b, and 8c. Not only the distributing fins but also the dish can be made of a thermoplastic material, especially an ultra-high-molecular weight polyethylene.

Figure 10:
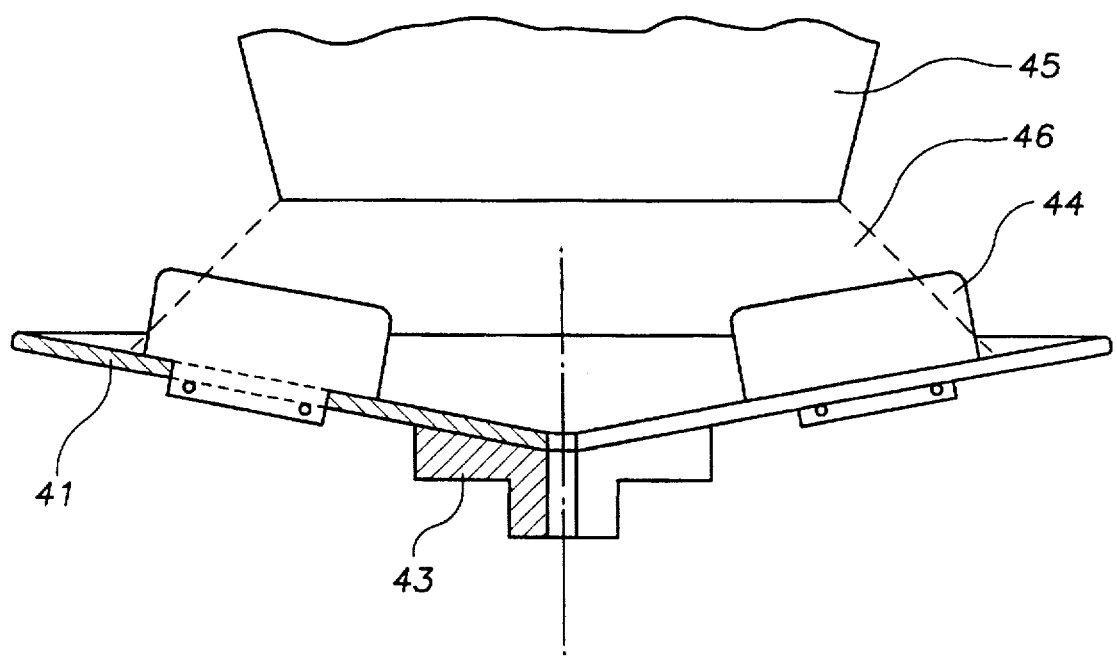
FIG. 10 shows the disk of FIG. 9 installed below a hopper to stop the flow of material when the disk is stationary.

FIG. 10 shows distributing disk 41 at rest, with its distributing fins 44 facing the lower end of container 45, which holds the bulk material. Bulk material has emerged from the container to form a cone 46 of bulk material. The distance between distributing disk 41 and the opening of container 45 and the diameter of dish 1 are calculated in such a way that cone 46 of loose material attains its angle of rest before it spreads all the way to the edge of the dish. The diameter of the dish must be significantly larger than the opening of the container. Conversely, the distance between dish 41 and the opening of container 45 may not be very large.

Figure 11B:
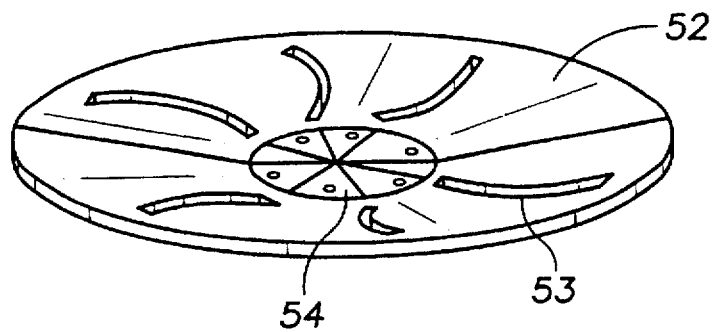
Figure 11A:
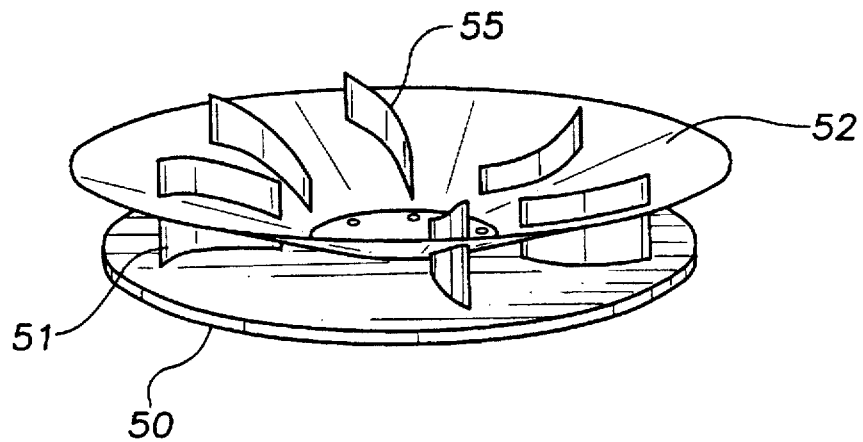
FIG. 11a shows an embodiment with a base disk and a scattering disk.

In the exemplary embodiment according to FIG. 11a, which is shown in perspective, a flat base disk 50 is provided, to which distribution fins 51 are attached as in FIGS. 8a–8c. Truncated cone shaped body concave (dish) 52 with slots 53 corresponding to the distributing fins is set down on top of distributing fins 51. In FIG. 11b, the dish appears by itself. Inner surface 54 of the dish rests on disk 50 and is connected to it.

The distributing fins must be taller in this variant. Their shape is such that their upper edges 55 are approximately parallel to the surface of the dish 52.

In this design, dish 52 supports distributing fins 51, which are attached to base disk 50. This is helpful when stones, lumps, etc., are present in the bulk material.

What is claimed is:

1. Spreading apparatus for discharging bulk materials, said apparatus comprising
 ring means,
 a downwardly tapering hopper having an upper end attached to said ring means and an opposed lower end,
 three legs, each leg having an upper end and an opposed lower end, said upper ends of said legs being releasably attached to said ring means at respective leg attachment points,
 three struts, each strut extending between a pair of legs toward the lower ends thereof, said struts being releasably attached to said legs at respective strut attachment points, and
 a plurality of tension cables, each cable having a top end joined to the ring proximate to a leg attachment point and a bottom end attached at a strut attachment point of an adjacent leg, the bottom of each cable being guided over a leg so that the legs are drawn against the struts.

2. Apparatus as in claim 1 further comprising a rubber elastic piece at each strut attachment point, each bottom end of each cable being fastened to one of said rubber elastic pieces.

3. Apparatus as in claim 2 wherein each rubber elastic piece is in the form of a roller having a central shaft, each rubber elastic piece being inserted between adjacent struts with said shaft parallel to the leg attached to said adjacent struts, said cable ends being fastened to said shaft.

4. Apparatus as in claim 3 further comprising
 a support plate,
 a pair of cables attaching said support plate to the roller shaft between each pair of struts,
 a scatter disk rotatably mounted on said support plate, and
 a motor for driving said scatter disk.

5. Apparatus as in claim 1 wherein said legs and said struts are made of high strength tubing.

6. Apparatus as in claim 5 further comprising a coupling at each leg attachment point, each said coupling comprising a tubular portion received in the upper end of a leg and a transverse portion which conforms to said ring.

7. Apparatus as in claim 5 further comprising a coupling at each strut attachment point, each said coupling comprising a portion conforming to a leg and two portions received in respective adjacent struts.

8. Apparatus as in claim 1 wherein said hopper comprises a high molecular weight polyethylene reinforced with a carbon fiber overlay at the lower end.

9. Apparatus for distributing bulk materials, which is to be carried by cables from a helicopter, and which contains a downwardly tapering hopper with an opening on the bottom end and a remotely controlled shutter for this opening, and with three legs and a scatter disk which when operated rotates underneath the shuttered opening, wherein a shutter plate (24) for the opening is suspended on two cables (25), and an apparatus {(2,} (22, 23, 26) for producing a linear movement is connected fixedly at one end to the shutter plate and to a stationary part (1) of the apparatus by means of at least one joint (point 1a) for pivotal movement, and that the plane of the opening is at such an angle to the hopper axis that the shutter plate (240) when in the closing position lies against the opening.

10. Apparatus according to claim 9, wherein the apparatus for producing the linear movement consists of an operating cylinder (22) with operating rod (23) and a return spring (26).

11. Apparatus according to claim 9 wherein the cables (25) are fastened to a suspension ring (2) for the hopper.

12. Apparatus according to claim 9 wherein the joint is fastened to a leg (1).

13. Apparatus to be carried by a helicopter for discharging bulk materials, said apparatus comprising downwardly tapering hopper with a shuttered opening at the bottom end and with three legs and a scatter disk revolving in operation under the opening, wherein the scatter disk (5) comprises a disk (30) with slots (31) running substantially radially and slingers (32) having lower portions inserted into these slots and upper portions with downward facing shoulders which rest against the disk, said lower portions having openings (33) below the disk and pin means (34) passed through said openings for releasably joining said slingers to said disk.

14. Apparatus according to claim 13 wherein the slingers (32) project at least partially above the openings (31) and are secured on the bottom of the disk (30) by pin means (34) passed through openings (33) in slingers (32).

15. Apparatus according to claim 13 wherein the slingers (32) consist of ultra-high molecular weight polyethylene.

16. Apparatus according to claim 13 wherein the disk (30) consists of ultra-high molecular weight polyethylene.

17. Apparatus to be carried by helicopter for distributing bulk material, comprising a downward-tapering container with an opening at the bottom end and three legs and also comprising a distributing assembly with essentially radial distributing fins, which rotate underneath the opening during operation, wherein the distributing assembly comprises a concave dish having an open top which faces the opening of the container in concentric manner, the dish being larger than the opening of the container and spaced therefrom so that the bulk material attains its angle of rest without overflowing the dish when the assembly is stationary, thereby preventing the escape of bulk material, the dish providing the sole means for preventing escape of bulk material when the assembly is stationary, the assembly further comprises a flat base disk having radial slots which receive said distributing fins, said fins being detachably connected to said base disk, said dish having a closed end which is received against said base disk and radial slots which receive said fins therethrough.

18. Apparatus according to claim 17 wherein the dish has the form of the surface of an inverted truncated cone which is open at the top.

19. Apparatus as in claim 18 wherein the dish is provided with essentially radial slots and distributing fins which fit into these slots; and wherein these distributing fins are connected detachably to the disk.

20. Apparatus as in claim 17 wherein the distributing fins are made of ultra-high-molecular weight polyethylene.

21. Apparatus to be carried by a helicopter for distributing bulk material, said apparatus comprising a downward tapering container with a bottom opening three legs, and a distributing assembly with essentially radial distributing fins which rotate underneath the opening during operation, wherein said assembly comprises a flat base disk to which said fins are fixed and a concave dish which is open at the top and faces the bottom opening of the container in a concentric manner, the dish having an inner surface which rests on the flat surface and is fixed to it, and slots which receive said fins therethrough, said dish being larger than the opening of the container and spaced therefrom so that the bulk material attains its angle of rest without overflowing the dish when the assembly is stationary, thereby preventing the escape of bulk material.

* * * * *